(12) United States Patent
Pang (10) Patent No.: US 11,790,266 B2
(45) Date of Patent: Oct. 17, 2023

(54) ANNOTATION METHOD AND DEVICE, AND STORAGE MEDIUM

(71) Applicant: Beijing Xiaomi Intelligent Technology Co., Ltd., Beijing (CN)

(72) Inventor: Yunping Pang, Beijing (CN)

(73) Assignee: BEIJING XIAOMI INTELLIGENT TECHNOLOGY CO., LTD., Beijing (CN)

( * ) Notice: Subject to any disclaimer, the term of this patent is extended or adjusted under 35 U.S.C. 154(b) by 563 days.

(21) Appl. No.: 16/880,954

(22) Filed: May 21, 2020

(65) Prior Publication Data

US 2021/0142125 A1    May 13, 2021

(30) Foreign Application Priority Data

Nov. 12, 2019    (CN) .......................... 201911102202.6

(51) Int. Cl.
| | |
|---|---|
| G06V 10/774 | (2022.01) |
| G06N 20/00 | (2019.01) |
| G06F 16/535 | (2019.01) |
| G06F 16/58 | (2019.01) |
| G06F 18/2415 | (2023.01) |
| G06F 18/10 | (2023.01) |
| G06V 10/764 | (2022.01) |
| G06V 20/10 | (2022.01) |

(52) U.S. Cl.
CPC ........... *G06N 20/00* (2019.01); *G06F 16/535* (2019.01); *G06F 16/5866* (2019.01); *G06F 18/10* (2023.01); *G06F 18/2415* (2023.01); *G06V 10/764* (2022.01); *G06V 10/7753* (2022.01); *G06V 20/10* (2022.01)

(58) Field of Classification Search
CPC .. G06K 9/6277; G06K 9/6298; G06K 9/6279; G06K 9/6256; G06K 9/6267; G06F 16/535; G06F 16/5866; G06N 7/005; G06N 20/00; G06V 10/764; G06V 10/7753; G06V 20/10
See application file for complete search history.

(56) References Cited

U.S. PATENT DOCUMENTS

| | | | |
|---|---|---|---|
| 8,458,174 B1 * | 6/2013 | Duerig ................... | G06F 16/50 707/723 |
| 2012/0039541 A1 * | 2/2012 | Fukui ................... | G06K 9/6282 382/224 |
| 2022/0067421 A1 * | 3/2022 | Zhang ................... | G06N 20/00 |

FOREIGN PATENT DOCUMENTS

CN    109408100 A    3/2019

OTHER PUBLICATIONS

Extended European Search Report in the European Application No. 20178354.5 dated Nov. 13, 2020, (10p).
(Continued)

*Primary Examiner* — John Villecco
*Assistant Examiner* — Han Hoang
(74) *Attorney, Agent, or Firm* — Arch & Lake LLP (57) ABSTRACT

An annotation method and device and a storage medium are provided. The annotation method includes operations as follows. A first probability value that a first sample image is annotated with an Nth tag when the first sample image is annotated with an Mth tag is determined based on first tag information of a first image set. M and N are unequal and are positive integers. The first probability value is added to second tag information of a second sample image annotated with the Mth tag in a second image set.

14 Claims, 6 Drawing Sheets

(56) References Cited

OTHER PUBLICATIONS

Abdulraheem, Ali et al., "An Automatic Image Tagging Based on Word Co-Occurrence Analysis", 2018 Fourth International Conference on Information Retrieval and Knowledge Management(CAMP), IEEE, Mar. 26, 2018, (5p).
Lin, Zijia et al., "Image Tag Completion via Image-Specific and Tag-Specific Linear Sparse Reconstructions", 2017 IEEE Conference on Computer Vision and Pattern Recognition (CVPR), IEEE Computer Society, US, Jun. 23, 2013, (8p).
Zhang, Juli et al., "Cograph Regularized Collective Nonnegative Matrix Factorization for Multilabel Image Annotation", IEEE Access, vol. 7, Jul. 1, 2019, (19p).
First Office Action of the Chinese Application No. 201911102202.6, dated Jan. 19, 2022, (16p).
Xu Li-Li, et al., "Emotion Classification of Multi-Label Correlation Based on Completion Matrix", Computer System Application, vol. 26 No.1, Dec. 31, 2017, (6p).
Liu Mengdi, et al., "Advances in Automatic Image Annotation", Computer Application, vol. 36, No. 8, Aug. 10, 2016, (English Abstract), (8p).
Roelof van Zwol, et al., "Flickr Tag Recommendation Based on Collective Knowledge", Proceedings of the 17h International Conference on World Wide Web, Apr. 21-25, 2008, (10p).

\* cited by examiner

ANNOTATION METHOD AND DEVICE, AND STORAGE MEDIUM

CROSS-REFERENCE TO RELATED APPLICATION

This application is based upon and claims priority to Chinese Patent Application No. 201911102202.6, filed on Nov. 12, 2019, the disclosure of which is hereby incorporated by reference in its entirety for all purposes.

TECHNICAL FIELD

The disclosure relates to the field of image processing, and more particularly to an annotation method and device, and a storage medium.

BACKGROUND

With the wide application of image recognition technology, image data become the essential basic data in image processing. The processing of basic data sets is the key step in image processing technology. One of the most important and difficult tasks is to let the computer understand the image semantics, and image annotation is the key technology. Image annotation includes single-tag annotation and multi-tag annotation. For example, an image includes features of blue sky, white cloud, and grassland. If only the feature of blue sky on the image is annotated, the image annotation is single-tag annotation. If the three features of blue sky, white cloud, and grassland on the image are annotated, the image annotation is multi-tag annotation.

In the related technology, the image annotation process is almost completed manually. Since single-tag annotation only needs annotating one tag while multi-tag annotation needs annotating multiple tags, the acquisition of image data sets in the multi-tag annotation becomes more complicated as compared with the acquisition of image data sets in the single-tag annotation. Especially for images with many features, the number of tags for multi-tag annotation increases explosively with the increase of the number of images. A lot of manpower and material resources are consumed to annotate a complete multi-tag data set.

SUMMARY

The disclosure provides an annotation method and device, and a storage medium.

According to a first aspect of the disclosure, the disclosure provides annotation method, which may include the following operations.

A first probability value that a first sample image is annotated with an Nth tag when the first sample image is annotated with an Mth tag may be determined based on first tag information of a first image set. M and N are unequal and are positive integers. Mth tag and the Nth tag are different types of tag. The first probability value may be added to second tag information of a second sample image annotated with the Mth tag in a second image set.

According to a second aspect of the disclosure, the disclosure further provides an annotation device. The annotation device includes a processor and a memory configured to store computer service capable of running on the processor. The processor is configured to run the computer service to implement operations of: determining, based on first tag information of a first image set, a first probability value that a first sample image is annotated with an Nth tag when the first sample image is annotated with an Mth tag, wherein M and N are unequal and are positive integers; and adding the first probability value to second tag information of a second sample image, annotated with the Mth tag, in a second image set.

According to a third aspect of the disclosure, the disclosure further provides a storage medium having stored thereon computer-executable instructions. The computer-executable instructions, when executed by a processor, implement an annotation method. The annotation method includes operations as follows.

A first probability value that a first sample image is annotated with an Nth tag when the first sample image is annotated with an Mth tag may be determined based on first tag information of a first image set. M and N are unequal and are positive integers. The first probability value may be added to second tag information of a second sample image annotated with the Mth tag in a second image set.

It should be understood that the above general description and the following detailed description are only exemplary and explanatory, rather than limiting the disclosure.

BRIEF DESCRIPTION OF THE DRAWINGS

The accompanying drawings, which are incorporated in and constitute a part of this description, illustrate embodiments consistent with the disclosure and along with the description, serve to explain the principles of the disclosure.

DETAILED DESCRIPTION

Exemplary embodiments are described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods in accordance with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1A:
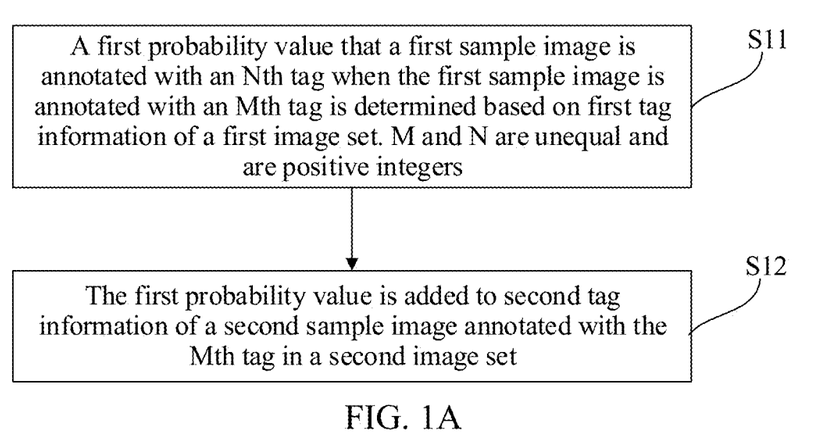
FIG. 1A is a flowchart of an annotation method according to one example.

FIG. 1A is a flowchart of an annotation method according to one example. As illustrated in FIG. 1A, the method includes the following operations.

At block S11, a first probability value that a first sample image is annotated with an Nth tag when the first sample image is annotated with an Mth tag is determined based on first tag information of a first image set. M and N are unequal and are positive integers.

Here, the first image set may be an image set in a certain application scenario. For example, the image set may be a face image set in a face recognition application scenario, and the image set may be a license plate image set in a license plate recognition application scenario. The first tag information may be tag information corresponding to image features in the first image. For example, the first image is a landscape picture, and the landscape picture includes image features such as grassland, blue sky and white cloud. If the image features grass, blue sky and white cloud in the landscape picture are annotated respectively by tag 1, tag 2 and tag 3, the first tag information includes tag 1 indicating grass, tag 2 indicating blue sky and tag 3 indicating white cloud.

The first tag information may be expressed by a feature vector. For example, the feature vector of the first tag information of the landscape picture is expressed as X={1, 2, 3}, where 1, 2, 3 are respectively tag values corresponding to tag 1, tag 2 and tag 3. Here, the Mth tag and the Nth tag are different types of tags.

Here, taking a landscape picture set as an example of the first image set, the process of determining the first probability value is described. The landscape picture set includes picture A, picture B and picture C. The pictures in the landscape picture set include three image features including grassland, blue sky and white cloud. It should be noted that the landscape picture may only include one or two of the three image features, or all of the three image features are annotated.

Table 1 illustrates the situation that the landscape pictures are annotated, "/" represents that the image feature is not annotated or the landscape picture does not contain the corresponding feature. Here, it should be noted that the tag values may be set flexibly according to needs. In this example, referring to FIG. 1B, the tag values of tag 1, tag 2 and tag 3 respectively corresponding to grassland, blue sky and white cloud are respectively set to be 1, 2 and 3.

TABLE 1

Image Feature Annotation Table

| Picture | First tag Grassland | Second tag Blue sky | Third tag White cloud |
|---------|---------------------|---------------------|-----------------------|
| Picture A | 1 | / | / |
| Picture B | 1 | 2 | / |
| Picture C | 1 | 2 | 3 |

Figure 1B:
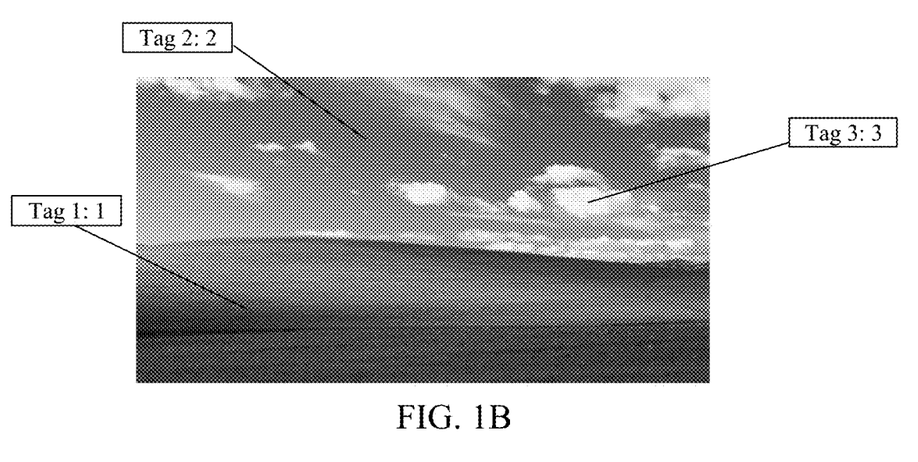
FIG. 1B is a schematic diagram illustrating annotating a landscape picture according to one example.

It can be seen that all of picture A, picture B and picture C in the landscape picture set are annotated with 1. In this case, both of picture B and picture C are annotated with 2, and thus the first probability value that the picture is annotated with 2 is ⅔. Only picture C is annotated with 3, and thus the first probability value that the picture is annotated with 3 is ⅓. In this way, it is determined that, when a picture is annotated with 1, the first probability value that the picture is annotated with 2 is ⅔ and the first probability value that the picture is annotated with 3 is ⅓.

Picture B and picture C in the landscape picture set are annotated with 2. In this case, both of picture B and picture C are annotated with 1, and thus the first probability value that the picture is annotated with 1 is 1. Only picture C is annotated with 3, and thus the first probability value that the picture is annotated with 3 is ½. In this way, it is determined that, when a picture is annotated with 2, the first type probability value that the picture is annotated with 1 is 1 and the first probability value that the picture is annotated with 3 is ½.

Picture C in the landscape picture set is annotated with 3. In this case, picture C is annotated with 1, and thus the first probability value that the picture is annotated with 1 is 1. Picture C is annotated with 2, and thus the first probability value that the picture is annotated with 2 is 1. In this way, it is determined that, when a picture is annotated with 3, the first probability value that the picture is annotated with 1 is 1, and the first probability value that the picture is annotated with 3 is 1. The above determination of the first probability value will be used in subsequent operation S12.

In block S12, the first probability value is added to second tag information of a second sample image annotated with the Mth tag in a second image set.

Here, the second tag information may be expressed by a feature vector. Also taking the landscape picture set as an example, a process of adding the first probability value is described. The landscape picture set includes picture A, picture B and picture C. The pictures in the landscape picture set include three image features including grassland, blue sky and white cloud. Table 2 illustrates the situation that the landscape pictures are annotated before the first probability value is added. "/" represents that the image feature is not annotated or the picture does not contain the corresponding feature. Here, it should be noted that the tag values 1, 2 and 3 in Table 2 may be set flexibly according to the needs.

TABLE 2

Image Feature Annotation Table

| Picture | First tag Grassland | Second tag Blue sky | Third tag White cloud | Tag information Second tag information (before the first probability value is added) |
|---|---|---|---|---|
| Picture A | 1 | / | / | {1, 0, 0} |
| Picture B | / | 2 | / | {0, 2, 0} |
| Picture C | / | / | 3 | {0, 0, 3} |

Here, the second tag information of picture A, picture B and picture C in the landscape picture set before the first probability value is added is expressed by feature vectors. The feature vectors corresponding to picture A, picture B and picture C are respectively represented as A={1, 0, 0}, B={0, 2, 0}, and C={0, 0, 3}. Here, the unannotated image feature is expressed as 0 in the feature vector.

Based on the determination process of the first probability value in operation S11, the following contents can be known.

When picture A is annotated with 1, the first probability value that picture A is annotated with 2 is ⅔, and the first probability value that picture A is annotated with 3 is ⅓.

When picture B is annotated with 2, the first probability value that picture B is annotated with 1 is 1, and the first probability value that picture B is annotated with 3 is ½.

When picture C is annotated with 3, the first probability value that picture C is annotated with 1 is 1, and the first probability value that picture C is annotated with 2 is 1.

According to the above contents, the second tag information of picture A after the first-type probability value is added is represented as A={1, ⅔, ⅓}.

The second tag information of picture B after the first-type probability value is added is represented as B={1, 2, ½}.

The second tag information of picture C after the first-type probability value is added is represented as C={1, 1, 3}.

Table 3 illustrates the situation that the landscape pictures are annotated after the first probability value is added.

TABLE 3

Image Feature Annotation Table

| Picture | First tag Grassland | Second tag Blue sky | Third tag White cloud | Tag information Second tag information (after the first probability value is added) |
|---|---|---|---|---|
| Picture A | 1 | 1/2 | 1/3 | {1, 1/2, 1/3} |
| Picture B | 1 | 2 | 1/2 | {1, 2, 1/2} |
| Picture C | 1 | 1 | 3 | {1, 1, 3} |

Figure 1C:
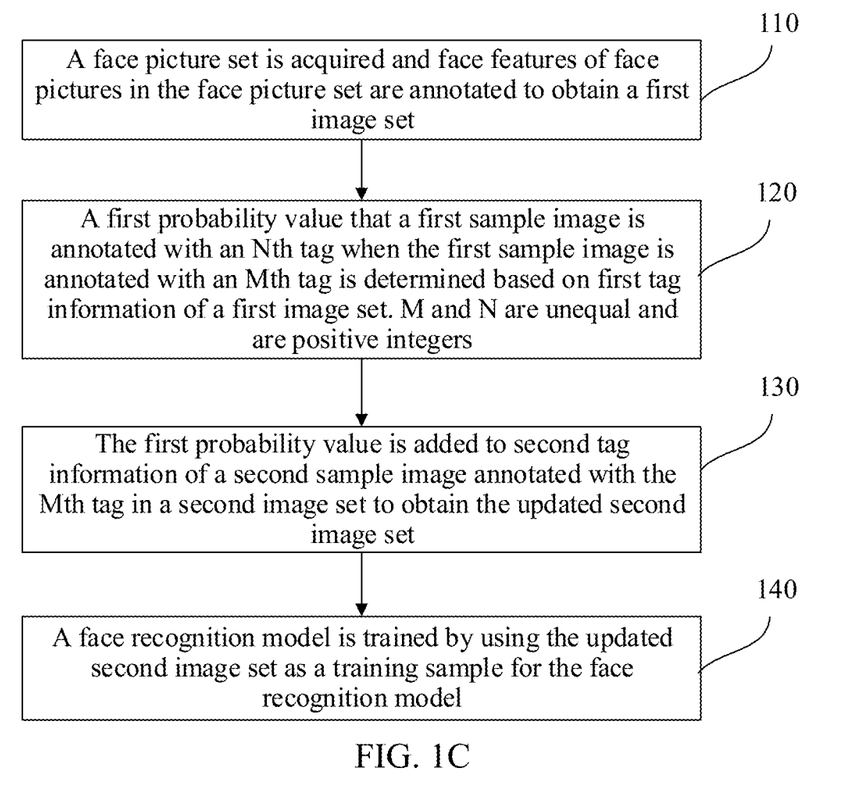
FIG. 1C is a flowchart of applying a method for training a face recognition model in the embodiment of the disclosure according to one example.

Here, referring to FIG. 1C, taking a face recognition application scenario as an example, a method for applying the image set obtained in the embodiment of the disclosure to face recognition training is disclosed. The method includes the following operations.

In operation 110, a face picture set is acquired and face features of face pictures in the face picture set are annotated to obtain a first image set. The face features include eyes, nose, mouth, hairs, etc. Here, each face feature corresponds to a tag. For example, eyes correspond to tag 1, nose corresponds to tag 2, etc.

In operation 120, a first probability value that a first sample image is annotated with an Nth tag when the first sample image is annotated with an Mth tag is determined based on first tag information of a first image set. M and N are unequal and are positive integers. Here, the first tag information includes information for annotating face features.

In operation 130, the first probability value is added to second tag information of a second sample image annotated with the Mth tag in a second image set to obtain the updated second image set.

In operation 140, a face recognition model is trained by using the updated second image set as a training sample for the face recognition model.

In the embodiment of the disclosure, a first probability value that a first sample image is annotated with an Nth tag when the first sample image is annotated with an Mth tag is determined based on first tag information of a first image set. Therefore, an associated relationship between the Mth tag and the Nth tag can be established through the first probability value. The first probability value is added to second tag information of a second sample image annotated with the Mth tag in a second image set. In this way, since the associated relationship between the Mth tag and the Nth tag is established through the first probability value, the first probability value can be directly added to the second tag information of the second sample images annotated with the Mth tag in the second image set based on the associated relationship, without annotating based on image features manually recognized, thereby improving annotation efficiency in multi-tag images. Thus, the proposed methods increase the efficiency of image annotation for the ever-increasing number of massive image data sets without annotating based on image features recognized manually.

Figure 2:
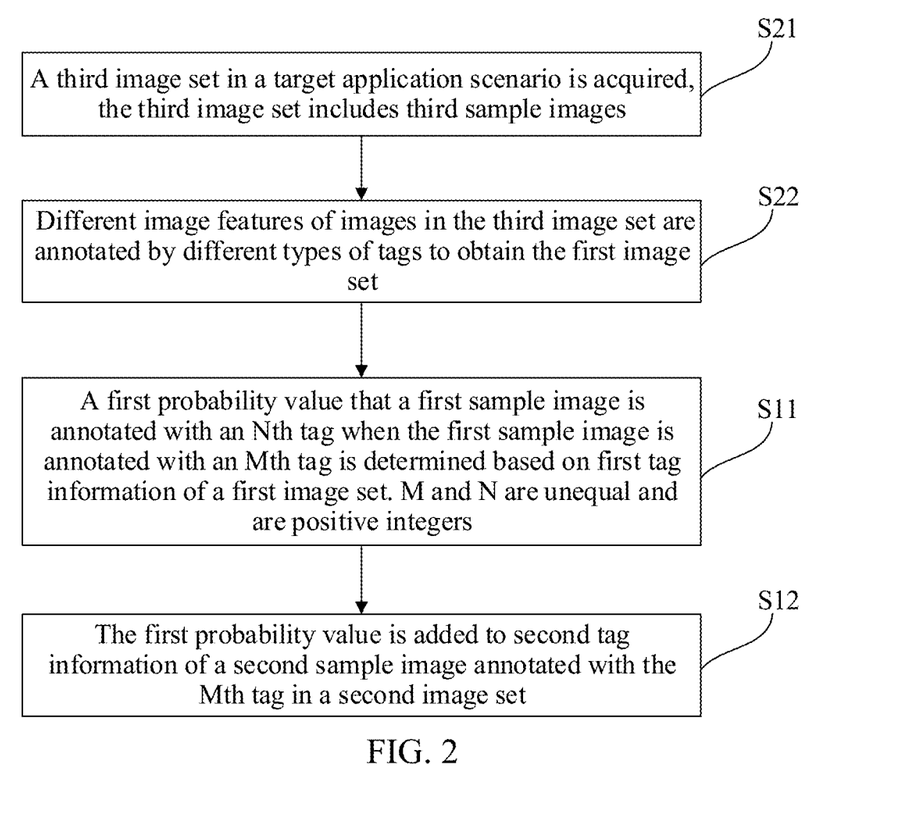
FIG. 2 is a flowchart of an annotation method according to one example.

FIG. 2 is a flowchart of an annotation method according to one example. As illustrated in FIG. 2, before operation S11 that the first probability value that the first sample image is annotated with the Nth tag when the first sample image is annotated with the Mth tag is determining based on the first tag information of the first image set, the method further includes the following operations.

In block S21, a third image set in a target application scenario is acquired.

Here, the target application scenario may include any scenario such as a face recognition application scenario, a license plate recognition application scenario, in which the annotated image sample set is to be applied. Taking the face recognition application scenario as an example, the third image set may include a plurality of face pictures. The face pictures may be shot in a specific lighting environment, at a specific shooting angle and a specific distance. For example, a face image sample set is obtained in an application scenario having light intensity of 1000 lux, a camera lens shooting angle of 60 degrees upwards relative to the horizontal plane, and a shooting distance from the person to the camera of 1 meter. Here, the third image set may be an existing data set.

At block S22, different image features of images in the third image set are annotated by different types of tags to obtain the first image set.

Here, the image features may include one or more following features: texture features, color features, shape features or the like in the images. Here, the different types of tags may be tags corresponding to different tag values. Taking a face image as an example, a face image may include eyes, nose, mouth, hairs and other shape features, which may be expressed as 1, 2, 3 and 4 respectively. A face image may also include features including black hairs and yellow skin, and the color features of black and yellow may be expressed as 5 and 6 respectively. Here, all different image features in the images in the third image set may be annotated.

Figure 3:
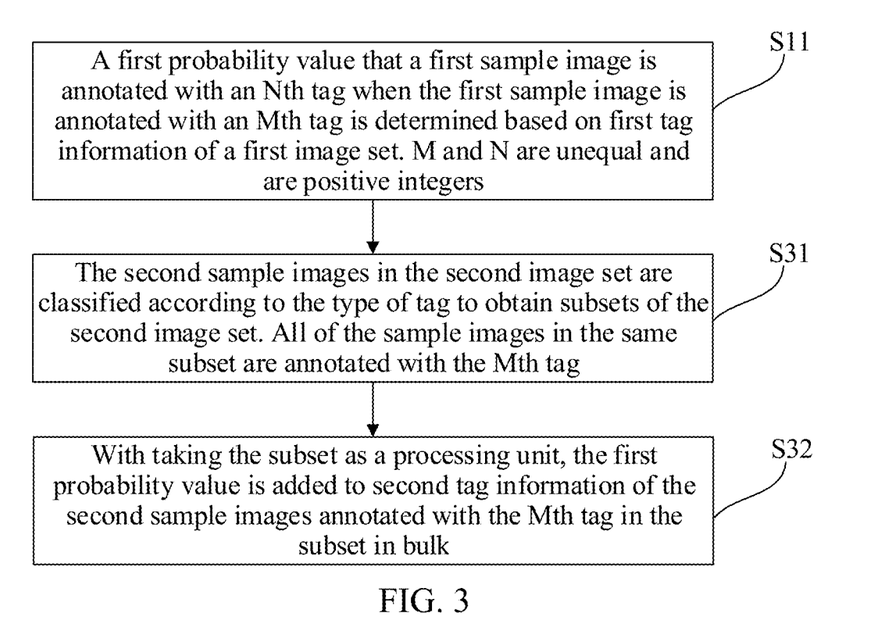
FIG. 3 is a flowchart of an annotation method according to one example.

FIG. 3 is a flowchart of an annotation method according to one example. As illustrated in FIG. 3, the method further includes operations as follows.

At block S31, the second sample images in the second image set are classified according to the type of tag to obtain subsets of the second image set. All of the sample images in the same subset are annotated with the Mth tag.

For example, the second sample images in the second image set include A1, A2, A3, A4, A5, A6, A7, A8 and A9. Taking the landscape picture as an example of the second sample images, the landscape image has three image features including blue sky, white cloud, and grassland. The above pictures are respectively expressed by feature vectors as follows.

A1: {1, 0, 0};
A2: {0, 0, 1};
A3: {1, 0, 0};
A4: {0, 1, 0};
A5: {1, 0, 0};
A6: {0, 0, 1};
A7: {0, 1, 0};
A8: {0, 0, 1};
A9: {1, 0, 0};

A first dimension, a second dimension and a third dimension of the feature vector are respectively used to indicate whether blue sky, white cloud, and grassland are annotated. Specifically, a value of each dimension represents whether the corresponding image feature is annotated, 1 represents that the image feature corresponding to the dimension is annotated, and 0 represents that the image feature corresponding to the dimension is not annotated. After the images in the second image set are classified according to the type of tag annotated, the second image set includes three subsets including a first subset, a second subset and a third subset. The first subset includes A1, A3, A5 and A9; the second subset includes A4 and A7; and the third subset includes A2, A6 and A8.

The operation S12 that the first probability value is added to the second tag information of the second sample image annotated with the Mth tag in the second image set includes an operation as follows.

At S32, with taking the subset as a processing unit, the first probability value is added to second tag information of the second sample images annotated with the Mth tag in the subset in bulk. For example, each subset is processed separately. For each of the subsets, the first probability value is added to second tag information of the second sample images annotated with the Mth tag in each subset in bulk.

Here, with taking the subset as a processing unit, the first probability value is added in bulk to second tag information of the second sample images annotated with the Mth tag in the subset, the second sample images having the same type of tag can be processed in bulk, thereby improving the processing efficiency. For example, since A1, A3, A5 and A9 in the first subset all include tag 1 corresponding to the first dimension, the same first probability value is added to the tag corresponding to the second dimension and the tag corresponding to the third dimension in bulk, so as to improve the adding efficiency.

Figure 4:
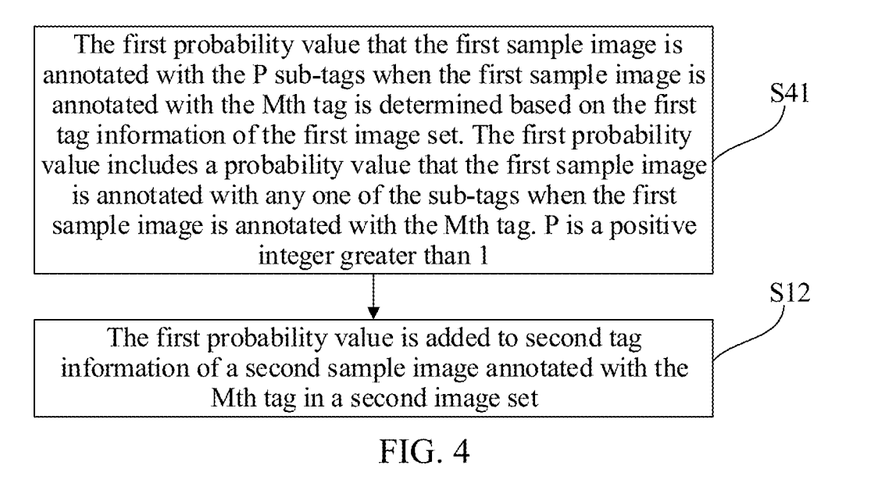
FIG. 4 is a flowchart of an annotation method according to one example.

FIG. 4 is a flowchart of an annotation method according to one example. As illustrated in FIG. 4, the Nth tag includes P different sub-tags, and the operation that the first probability value that the first sample image is annotated with the Nth tag when the first sample image is annotated with the Mth tag is determined based on the first tag information of the first image set includes an operation as follows.

At S41, the first probability value that the first sample image is annotated with the P sub-tags when the first sample image is annotated with the Mth tag is determined based on the first tag information of the first image set. The first probability value includes a probability value that the first sample image is annotated with any one of the sub-tags when the first sample image is annotated with the Mth tag. P is a positive integer greater than 1.

Here, also taking the landscape image as an example, the first sample images include three image features including blue sky, white cloud, and grassland. The first image set includes three first sample images including picture A, picture B and picture C, and the annotation situation is illustrated in Table 4.

TABLE 4

Image Feature Annotation Table

| Picture | First tag<br>Grassland | Second tag | |
|---------|------------------------|------------|--|
|         |                        | Sub-tag 1<br>Blue sky | Sub-tag 2<br>White cloud |
| Picture A | 1 | 2 | 3 |
| Picture B | 1 | 2 | / |
| Picture C | 1 | 2 | 3 |

It can be seen that, when the first sample image is annotated with the tag corresponding to grassland, pictures annotated with the sub-tag corresponding to blue sky include picture A, picture B and picture C, and thus the probability value that the first sample image is annotated with the sub-tag 1 is 1. Pictures annotated with the sub-tag corresponding to white cloud include picture A and picture C, and thus the probability value that the first sample image is annotated with the sub-tag 2 is ⅔. That is to say, the first probability value includes 1 and ⅔.

Here, it is determined that, when the first sample image is annotated with the tag corresponding to grassland, the probability value that the first sample image is annotated with blue sky is 1, and the probability value that the first sample image is annotated with white cloud is ⅔. When the second image sample is annotated with grassland, blue sky and white cloud in the second image sample can be annotated respectively by the probabilities 1 and ⅔. Here, the existing data set with multiple tags can be effectively utilized.

Figure 5:
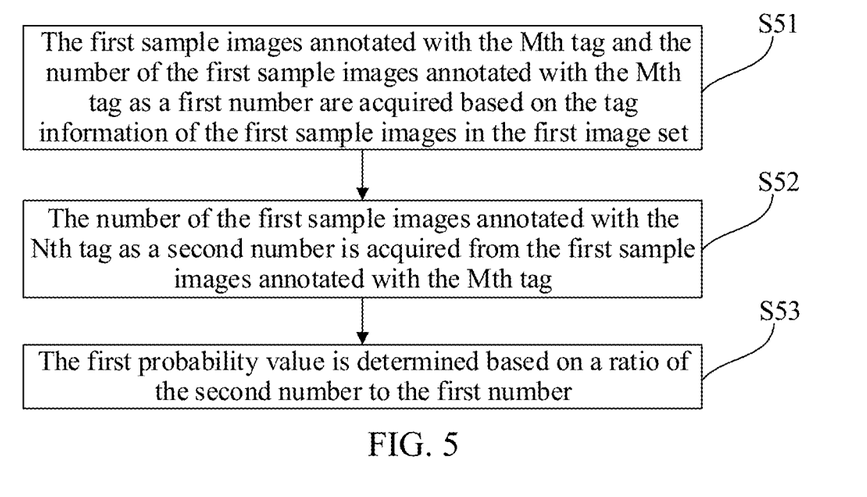
FIG. 5 is a flowchart of an annotation method according to one example.

FIG. 5 is a flowchart of an annotation method according to one example. As illustrated in FIG. 5, the operation S11 that the first probability value that the first sample image is annotated with the Nth tag when the first sample image is annotated with the Mth tag is determined based on the first tag information of the first image set includes operations as follows.

At block S51, the first sample images annotated with the Mth tag and the number of the first sample images annotated with the Mth tag as a first number are acquired based on the tag information of the first sample images in the first image set. The first number is the number of the first sample images in the first image set which are annotated with the Mth tag.

Here, taking the landscape picture as an example, the Mth tag may be the tag corresponding to the image feature of grassland. Assuming that there are 10 first sample images annotated with the tag of grassland in the first image set, the first number is 10.

At block S52, the number of the first sample images annotated with the Nth tag as a second number is acquired from the first sample images annotated with the Mth tag. The second number is the number of the first sample images annotated with the Nth tag.

Here, assuming that the Nth tag is the tag corresponding to blue sky, and assuming that the number of the first sample images annotated with the tag of blue sky in the first sample images annotated with the tag of grassland is 5, the second number is 5.

At block S53, the first probability value is determined based on a ratio of the second number to the first number.

Based on the first number and the second number, the first probability value is represented as $5/10=1/2$.

Figure 6:
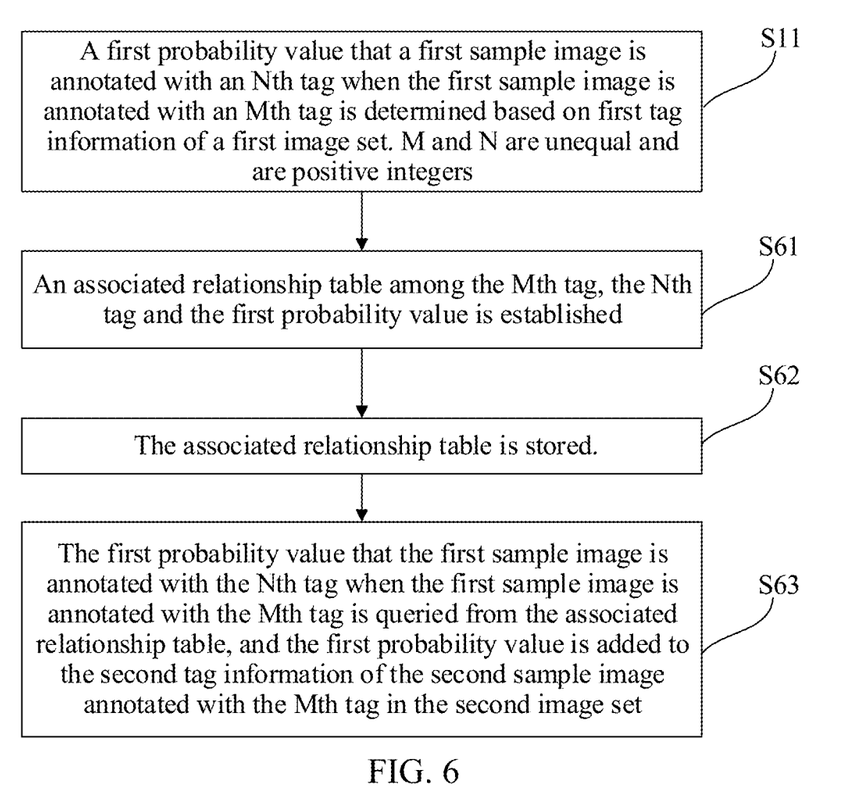
FIG. 6 is a flowchart of an annotation method according to one example.

FIG. 6 is a flowchart of an annotation method according to one example. As illustrated in FIG. 6, the method further includes the following operations.

At block S61, an associated relationship table among the Mth tag, the Nth tag and the first probability value is established.

Here, still taking the landscape picture as an example, the landscape pictures include tag 1 for annotating grassland, tag 2 for annotating blue sky, and tag 3 for annotating white cloud. When the first sample image is annotated with tag 1, the first probability value that the first sample image is annotated with tag 2 is $1/3$. When the first sample image is annotated with tag 2, the first probability value that the first sample image is annotated with tag 1 is $1/2$. When the first sample image is annotated with tag 1, the first probability value that the first sample image is annotated with tag 3 is $1/6$. When the first sample image is annotated with tag 3, the first probability value that the first sample image is annotated with tag 1 is $1/2$. When the first sample image is annotated with tag 2, the first probability value that the first sample image is annotated with tag 3 is $1/5$. When the first sample image is annotated with tag 3, the first probability value that the first sample image is annotated with tag 2 is $1/2$. The associated relationship table can be shown in Table 5 below.

TABLE 5

Image Feature Annotation Table

| Type of tag Mth tag | Type of tag Nth tag | Probability value First probability value |
|---|---|---|
| 1 | 2 | 1/3 |
| 2 | 1 | 1/2 |
| 1 | 3 | 1/6 |
| 3 | 1 | 1/2 |
| 2 | 3 | 1/5 |
| 3 | 2 | 1/2 |

At block S62, the associated relationship table is stored.

Here, the data in Table 5 may be sequentially stored in a storage unit.

The operation that the first probability value is added to the second tag information of the second sample image annotated with the Mth tag in the second image set includes an operation as follows.

At block S63, the first probability value that the first sample image is annotated with the Nth tag when the first sample image is annotated with the Mth tag is queried from the associated relationship table, and the first probability value is added to the second tag information of the second sample image annotated with the Mth tag in the second image set.

Here, the first probability value that the first sample image is annotated with the Nth tag when the first sample image is annotated with the Mth tag is queried from the associated relationship table, the Mth tag and the Nth tag may be used as query index numbers to query from the associated relationship table. For example, taking Table 5 as an example, when the Mth tag is 1 and the Nth tag is 2, the queried first probability value is $1/3$.

Figure 7:
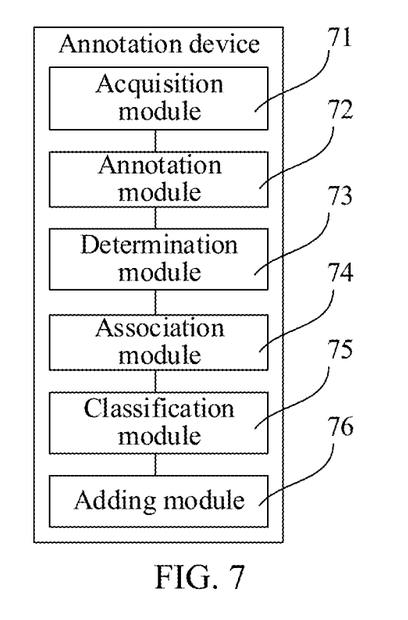
FIG. 7 is a block diagram of an annotation device according to one example.

FIG. 7 is a block diagram of an annotation device according to an example. As illustrated in FIG. 7, the device includes a determination module 73 and an adding module 76.

The determination module 73 is configured to determine, based on first tag information of a first image set, a first probability value that a first sample image is annotated with an Nth tag when the first sample image is annotated with an Mth tag. M and N are unequal and are positive integers.

The adding module 76 is configured to add the first probability value to second tag information of a second sample image annotated with the Mth tag in a second image set.

The device further includes an acquisition module 71 and an annotation module 72.

The acquisition module 71 is configured to acquire a third image set in a target application scenario. The third image set includes third sample images.

The annotation module 72 is configured to annotate different image features of the third sample images by different types of tags to obtain the first image set.

The device further includes a classification module 75.

The classification module 75 is configured to classify the second sample images in the second image set according to the type of tag, to obtain subsets of the second image set. All of the sample images in the same subset are annotated with the Mth tag.

The adding module 76 is further configured to, with taking the subset as a processing unit, add the first probability value to the second tag information of the second sample images annotated with the Mth tag in the subset in bulk.

The Nth tag includes P different sub-tags, and the determination module 73 is further configured to determine, based on the first tag information of the first image set, the first probability value that the first sample image is annotated with the P sub-tags when the first sample image is annotated with the Mth tag. The first probability value includes a probability value that the first sample image is annotated with any one of the sub-tags when the first sample image is annotated with the Mth tag. P is a positive integer greater than 1.

The determination module 73 is further configured to acquire, based on the tag information of the first sample images in the first image set, the first sample images annotated with the Mth tag and the number of the first sample images annotated with the Mth tag as a first number; acquire, from the first sample images annotated with the Mth tag, the number of the first sample images annotated with the Nth tag as a second number; determine the first probability value based on a ratio of the second number to the first number.

The device further includes an association module 74. The association module 74 is configured to establish an associated relationship table among the Mth tag, the Nth tag and the first probability value, and store the associated relationship table.

The determination module 73 is further configured to query, from the associated relationship table, the first probability value that the first sample image is annotated with the Nth tag when the first sample image is annotated with the Mth tag, and add the first probability value to second tag information of a second sample image annotated with the Mth tag in the second image set.

Figure 8:
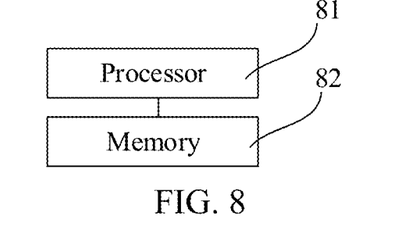
FIG. 8 is a block diagram of an annotation device according to one example.

FIG. 8 is a block diagram of an annotation device according to an example. As illustrated in FIG. 8, the device includes a processor 81 and a memory 82 configured to store computer service capable of running on the processor 81. The processor 81 is configured to run the computer service to execute the following operations: determining, based on first tag information of a first image set, a first probability value that a first sample image is annotated with an Nth tag when the first sample image is annotated with an Mth tag, where M and N are unequal and are positive integers; adding the first probability value to second tag information of a second sample image annotated with the Mth tag in a second image set.

The processor 81 is further configured to run the computer program to execute the following operations: acquiring a third image set in a target application scenario, where the third image set includes third sample images; annotating different image features of the third sample images by different types of tags to obtain the first image set.

The processor 81 is further configured to run the computer program to execute the following operations: classifying the second sample images in the second image set according to the type of tag to obtain subsets of the second image set, where all of the sample images in the same subset are annotated with the Mth tag; and with taking the subset as a processing unit, adding in bulk the first probability value to the second tag information of the second sample images annotated with the Mth tag in the subset.

The processor 81 is further configured to run the computer program to execute the following operations: when the Nth tag includes P different sub-tags, determining, based on the first tag information of the first image set, the first probability value that the first sample image is annotated with the P sub-tags when the first sample image is annotated with the Mth tag, where the first probability value includes a probability value that the first sample image is annotated with any one of the sub-tags when the first sample image is annotated with the Mth tag. P is a positive integer greater than 1.

The processor 81 is further configured to run the computer program to execute the following operations: acquiring, based on the tag information of the first sample images in the first image set, the first sample images annotated with the Mth tag and the number of the first sample images annotated with the Mth tag as a first number; acquiring, from the first sample images annotated with the Mth tag, the number of the first sample images annotated with the Nth tag as a second number; determining the first probability value based on a ratio of the second number to the first number.

The processor 81 is further configured to run the computer program to execute the following operations: establishing an associated relationship table among the Mth tag, the Nth tag and the first probability value; storing the associated relationship table; querying, from the associated relationship table, the first probability value that the first sample image is annotated with the Nth tag when the first sample image is annotated with the Mth tag, and adding the first probability value to the second tag information of the second sample image annotated with the Mth tag in the second image set.

The embodiment of the disclosure further provides a storage medium having stored thereon computer-executable instructions, which, when executed by a processor, implement the annotation method according to any one of the embodiments of the disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This present application is intended to cover any variations, uses, or adaptations of the present disclosure conforming to the general principles thereof and including such departures from the present disclosure as come within known or customary practice in the art. The specification and embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

What is claimed is:

1. An annotation method, performed by an annotation device comprising a processor and a memory, comprising:
   acquiring, by the processor, a face picture set,
   annotating, by the processor, face features of face pictures in the face picture set to obtain a first image set;
   determining, by the processor, based on first tag information of the first image set, a first probability value that a first sample image is annotated with an Nth tag, given that the first sample image is annotated with an Mth tag, wherein M and N are unequal and are positive integers, wherein the first image set comprises a plurality of first sample images, and part of the first sample images in the first image set are annotated with the Mth tag; and
   adding, by the processor, the first probability value to second tag information of a second sample image, annotated with the Mth tag, in a second image set, to obtain an updated second image set and annotate the second sample image with the Nth tag by using the first probability value, wherein the second tag information is expressed by a feature vector, and the updated second image set is used as a training sample for a face recognition model to train the face recognition model, wherein the method further comprises:

establishing, by the processor, an associated relationship table among the Mth tag, the Nth tag and the first probability value; and storing, by the processor, the associated relationship table in the memory;

wherein adding, by the processor, the first probability value to the second tag information of the second sample image, annotated with the Mth tag, in the second image set comprises:

querying, by the processor, from the associated relationship table stored in the memory, the first probability value that the first sample image is annotated with the Nth tag when the first sample image is annotated with the Mth tag, and adding, by the processor, the first probability value to the second tag information of the second sample image annotated with the Mth tag in the second image set, wherein determining, by the processor, based on the first tag information of the first image set, the first probability value that the first sample image is annotated with the Nth tag, given that the first sample image is annotated with the Mth tag comprises:

acquiring, by the processor, based on the tag information of the first sample images in the first image set, the first sample images annotated with the Mth tag and the number of the first sample images annotated with the Mth tag as a first number;

acquiring, by the processor, from the first sample images annotated with the Mth tag, the number of the first sample images annotated with the Nth tag as a second number; and determining, by the processor, the first probability value based on a ratio of the second number to the first number.

2. The annotation method of claim 1, further comprising:
acquiring a third image set in a target application scenario, wherein the third image set comprises third sample images; and
annotating different image features of the third sample images by using different types of tags to obtain the first image set before determining, based on the first tag information of the first image set, the first probability value.

3. The annotation method of claim 1, further comprising:
classifying the second sample images in the second image set according to a type of tag to obtain subsets of the second image set, wherein each of the sample images in a same subset is annotated with the Mth tag.

4. The annotation method of claim 3, wherein adding the first probability value to the second tag information of the second sample image annotated with the Mth tag in the second image set comprises:
for each of the subsets of the second image set, adding in bulk the first probability value to the second tag information of the second sample images annotated with the Mth tag.

5. The annotation method of claim 1, wherein the Nth tag comprises P different sub-tags, and the determining, based on the first tag information of the first image set, the first probability value that the first sample image is annotated with the Nth tag when the first sample image is annotated with the Mth tag comprises:
determining, based on the first tag information of the first image set, the first probability value that the first sample image is annotated with the P sub-tags when the first sample image is annotated with the Mth tag, wherein the first probability value comprises a probability value that the first sample image is annotated with any one of the sub-tags when the first sample image is annotated with the Mth tag, wherein P is a positive integer greater than 1.

6. An annotation device, comprising:
one or more processors; and
a memory configured to store instructions capable of running on the one or more processors,
wherein the one or more processors are configured to run the instructions to implement acts comprising:
acquiring a face picture set,
annotating face features of face pictures in the face picture set to obtain a first image set;
determining, based on first tag information of the first image set, a first probability value that a first sample image is annotated with an Nth tag, given that the first sample image is annotated with an Mth tag, wherein M and N are unequal and are positive integers, wherein the first image set comprises a plurality of first sample images, and part of the first sample images in the first image set are annotated with the Mth tag; and
adding the first probability value to second tag information of a second sample image, annotated with the Mth tag, in a second image set, to obtain an updated second image set and annotate the second sample image with the Nth tag by using the first probability value, wherein the second tag information is expressed by a feature vector, and the updated second image set is used as a training sample for a face recognition model to train the face recognition model,
wherein the acts further comprise:
establishing an associated relationship table among the Mth tag, the Nth tag and the first probability value; and
storing the associated relationship table in the memory;
wherein the acts further comprise:
querying, from the associated relationship table stored in the memory, the first probability value that the first sample image is annotated with the Nth tag when the first sample image is annotated with the Mth tag, and adding, by the processor, the first probability value to the second tag information of the second sample image annotated with the Mth tag in the second image set,
wherein the acts further comprise:
acquiring, based on the tag information of the first sample images in the first image set, the first sample images annotated with the Mth tag and the number of the first sample images annotated with the Mth tag as a first number;
acquiring, from the first sample images annotated with the Mth tag, the number of the first sample images annotated with the Nth tag as a second number; and
determining the first probability value based on a ratio of the second number to the first number.

7. The annotation device of claim 6, wherein the acts further comprise:
acquiring a third image set in a target application scenario, wherein the third image set comprises third sample images; and
annotating different image features of the third sample images by using different types of tags to obtain the first image set.

8. The annotation device of claim 6, wherein the acts further comprise:

classifying the second sample images in the second image set according to a type of tag to obtain subsets of the second image set, wherein each of the sample images in a same subset is annotated with the Mth tag, for each of the subsets of the second image set, adding in bulk the first probability value to the second tag information of the second sample images annotated with the Mth tag.

9. The annotation device of claim 6, wherein the Nth tag comprises P different sub-tags, and the acts further comprise:

determining, based on the first tag information of the first image set, the first probability value that the first sample image is annotated with the P sub-tags when the first sample image is annotated with the Mth tag, wherein the first probability value comprises a probability value that the first sample image is annotated with any one of the sub-tags when the first sample image is annotated with the Mth tag, wherein P is a positive integer greater than 1.

10. A non-transitory storage medium having stored thereon computer-executable instructions, wherein the computer-executable instructions, when executed by one or more processors, implement acts comprising:

acquiring a face picture set, annotating face features of face pictures in the face picture set to obtain a first image set;

determining, based on first tag information of the first image set, a first probability value that a first sample image is annotated with an Nth tag, given that the first sample image is annotated with an Mth tag, wherein M and N are unequal and are positive integers, wherein the first image set comprises a plurality of first sample images, and part of the first sample images in the first image set are annotated with the Mth tag; and adding the first probability value to second tag information of a second sample image, annotated with the Mth tag, in a second image set, to obtain an updated second image set and annotate the second sample image with the Nth tag by using the first probability value, wherein the second tag information is expressed by a feature vector, and the updated second image set is used as a training sample for a face recognition model to train the face recognition model, wherein the acts further comprise:

establishing an associated relationship table among the Mth tag, the Nth tag and the first probability value; and storing the associated relationship table in the memory;

wherein adding, by the processor, the first probability value to the second tag information of the second sample image, annotated with the Mth tag, in the second image set comprises:

querying, from the associated relationship table stored in the memory, the first probability value that the first sample image is annotated with the Nth tag when the first sample image is annotated with the Mth tag, and adding the first probability value to the second tag information of the second sample image annotated with the Mth tag in the second image set, wherein determining, by the processor, based on the first tag information of the first image set, the first probability value that the first sample image is annotated with the Nth tag, given that the first sample image is annotated with the Mth tag comprises:

acquiring, based on the tag information of the first sample images in the first image set, the first sample images annotated with the Mth tag and the number of the first sample images annotated with the Mth tag as a first number;

acquiring, from the first sample images annotated with the Mth tag, the number of the first sample images annotated with the Nth tag as a second number; and determining the first probability value based on a ratio of the second number to the first number.

11. The non-transitory storage medium of claim 10, wherein the annotation method further comprises: before the determining, based on the first tag information of the first image set, the first probability value that the first sample image is annotated with the Nth tag when the first sample image is annotated with the Mth tag, acquiring a third image set in a target application scenario, wherein the third image set comprises third sample images; and annotating different image features of the third sample images by using different types of tags to obtain the first image set.

12. The non-transitory storage medium of claim 10, wherein the acts further comprise:

classifying the second sample images in the second image set according to a type of tag to obtain subsets of the second image set, wherein each of the sample images in a same subset is annotated with the Mth tag.

13. The non-transitory storage medium of claim 12, wherein adding the first probability value to the second tag information of the second sample image annotated with the Mth tag in the second image set comprises:

for each of the subset of the second image set, adding in bulk the first probability value to the second tag information of the second sample images annotated with the Mth tag.

14. The non-transitory storage medium of claim 10, wherein the Nth tag comprises P different sub-tags, and the determining, based on the first tag information of the first image set, the first probability value that the first sample image is annotated with the Nth tag when the first sample image is annotated with the Mth tag comprises:

determining, based on the first tag information of the first image set, the first probability value that the first sample image is annotated with the P sub-tags when the first sample image is annotated with the Mth tag, wherein the first probability value comprises a probability value that the first sample image is annotated with any one of the sub-tags when the first sample image is annotated with the Mth tag, wherein P is a positive integer greater than 1.

* * * * *